United States Patent [19]

Hayakawa

[11] 4,304,210

[45] Dec. 8, 1981

[54] SYSTEM AND METHOD FOR CONTROLLING EGR IN INTERNAL COMBUSTION ENGINE

[75] Inventor: Yukio Hayakawa, Kawasaki, Japan

[73] Assignee: Nissan Motor Co., Ltd., Yokohama, Japan

[21] Appl. No.: 148,939

[22] Filed: May 12, 1980

[30] Foreign Application Priority Data

May 15, 1979 [JP] Japan .................. 54-58680

[51] Int. Cl.³ .......................................... F02M 25/06
[52] U.S. Cl. .................................... 123/571; 123/568
[58] Field of Search ............... 123/568, 569, 571, 570

[56] References Cited

U.S. PATENT DOCUMENTS

| | | | |
|---|---|---|---|
| 3,512,509 | 5/1970 | Daigh | 123/568 |
| 3,513,816 | 5/1970 | Daigh | 123/568 |
| 3,587,541 | 6/1971 | Sarto | 123/568 |
| 3,934,564 | 1/1976 | Barnert | 123/568 |
| 3,941,105 | 3/1976 | Yagi et al. | 123/568 |
| 4,056,083 | 11/1977 | Wakita | 123/571 |

FOREIGN PATENT DOCUMENTS 54-3623  1/1979  Japan .................. 123/568

Primary Examiner—Wendell E. Burns
Attorney, Agent, or Firm—Lowe, King, Price & Becker

[57] ABSTRACT

A system for controlling exhaust gas recirculation in an internal combustion engine, comprising means for performing exhaust gas recirculation in a first required value when an engine temperature is at a first predetermined level or higher, means for stopping exhaust gas recirculation when said engine temperature reaches a second predetermined level or lower, the second predetermined level being lower than the first predetermined level, and means for performing exhaust gas recirculation in a second required value which is lower than the first required value, within a temperature range between first and second predetermined levels, the second required value increasing as a function of the engine temperature in response to increase in the engine temperature, thereby preventing exhaust gas recirculation from being abruptly carried out in large amounts so as to improve the driveability of a motor vehicle on which the engine is mounted.

8 Claims, 3 Drawing Figures

SYSTEM AND METHOD FOR CONTROLLING EGR IN INTERNAL COMBUSTION ENGINE

BACKGROUND OF THE INVENTION

This invention relates to an exhaust gas recirculation (EGR) control system in an internal combustion engine, and more particularly to an EGR control system of the type associated with a control unit in which a required value of exhaust gas recirculation at a first predetermined engine temperature is previously memorized as a function of some engine operating parameters, which system is so arranged that exhaust gas recirculation is stopped when the engine temperature is below a second predetermined engine temperature which is lower than the first predetermined engine temperature.

In connection with a known EGR control system of the above-mentioned type, a required value of exhaust gas recirculation at a high engine coolant temperature such as 8° C. is previously memorized in a control unit as a function of, for example, the pulse width for controlling fuel injection, which pulse width corresponding to an engine speed and an intake air amount. The engine coolant temperature is sensed by an engine coolant temperature sensor. Such EGR control system is so arranged that the exhaust gas recirculation is stopped when the engine coolant temperature is at a certain low level such as one below 35° C., whereas the exhaust gas recirculation is carried out in the required value when the engine coolant temperature exceeds 35° C.

In this regard, this EGR control system has encountered a problem in that exhaust gas recirculation in large amounts abruptly begins to be formed when the engine coolant temperature exceeds 35° C. This causes combustion in the engine to deteriorate, which results in degradation in driveability of a motor vehicle on which the engine is amounted.

SUMMARY OF THE INVENTION

According to the present invention, exhaust gas recirculation is performed in a first required value when an engine temperature is at a first predetermined level or higher, and the exhaust gas recirculation is stopped when the engine temperature reaches a second predetermined level or lower, the second predetermined level being lower than the first predetermined level. Additionally, the exhaust gas recirculation is performed in a second required value lower than the first required value, within a temperature range between first and second predetermined levels, the second predetermined value increasing as a function of the engine temperature in response to increase in the engine temperature.

A main object of the present invention is to provide an improved system and method for controlling exhaust gas recirculation, in an internal combustion engine, by which exhaust gas recirculation does not cause degradation in driveability of a motor vehicle on which the engine is mounted.

Another object of the present invention to provide an improved system and method for controlling exhaust gas recirculation in an internal combustion engine, by which exhaust gas recirculation can be prevented from being abruptly carried out in large amounts so as to improve the driveability of a motor vehicle on which the engine is mounted.

A further object of the present invention is to provide an improve system and method for controlling exhaust gas recirculation in a motor vehicle, by which stable engine running is maintained even when exhaust gas recirculation begins to be carried out upon an engine temperature reaching a predetermined level.

Other objects, features and advantages of the present invention will be more apparent from the following description when taken in conjunction with the accompanying drawings.

DESCRIPTION OF THE PREFERRED EMBODIMENT

Figure 1:
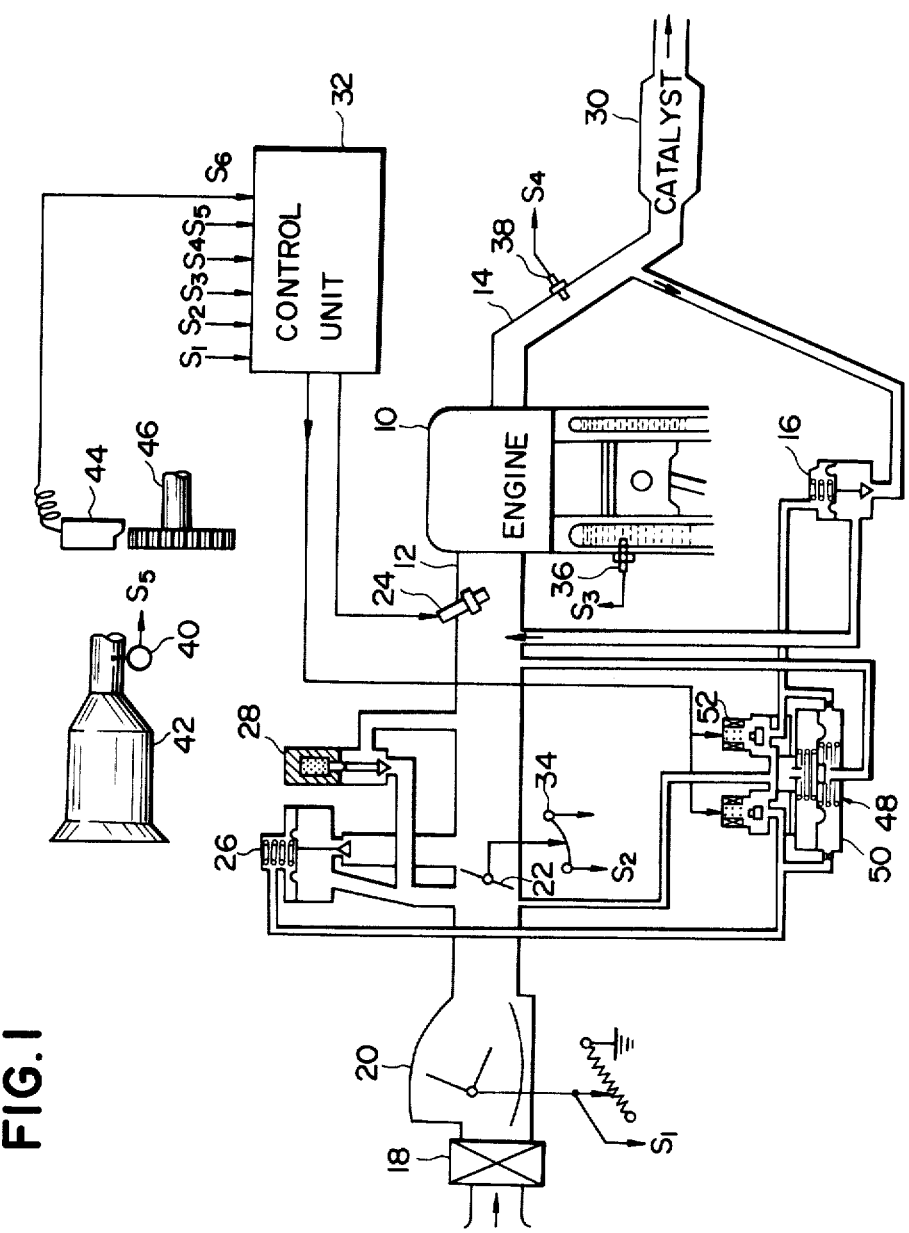
FIG. 1 is a schematic illustration of an exhaust gas recirculation control system to which the present invention is applied.

Referring now to FIG. 1 of the drawings, an exhaust gas recirculation (EGR) system according to the present invention is shown incorporated with an internal combustion engine 10 which is provided with an intake air conduit or passageway 12 and an exhaust gas conduit or passageway 14. The intake air and exhaust gas passageways 12 and 14 are communicable through an exhaust gas recirculation control value 16, by which a part of exhaust gas flowing through the exhaust gas passageway 14 is recirculated back or supplied to the intake air passageway 12 when required. The intake passageway 12 is provided with an air filter 18 to purify atmospheric air inducted into the engine 10. An air flow meter 20 is disposed in the intake air passageway 12 downstream of the air filter 18 to measure the air amount flowing through the intake air passageway 12. A throttle valve 22 is rotatably disposed in the intake passageway 12 downstream of the air flow meter 20 so as to control the air flow amount passing through the intake air passageway 12. A fuel injector 24 is disposed in the intake passageway 12 immediately upstream of the engine 10 in order to inject metered fuel to be supplied to the engine 10. An idle control valve 26 is fluidly connected to the intake air passageway 12 to control air required for idling. An air regulator 28 is also fluidly connected to the intake passageway 12 to control air supplied downstream of the throttle valve 22. A catalytic converter 30 is disposed in the exhaust gas passageway 14 to oxidize and reduce the noxious constituents in the exhaust gases passing through the exhaust gas passageway 14.

A control unit 32 is provided to process various inputs and to electrically and indirectly control the EGR control valve 16 and the fuel injection from the fuel injector 24. The various inputs, in this case, consist of an air flow amount output signal $S_1$ from the air flow meter 20, an output signal $S_2$ from a throttle valve switch 34 operatively connected to the throttle valve 22, an output signal $S_3$ from an engine coolant temperature sensor 36 disposed in an engine coolant passage (no numeral) formed in the engine 10, an output signal $S_4$ from an oxygen sensor 38, an output signal $S_5$ from a vehicle speed sensor 40 installed in connection with the output shaft of a transmission 42, and a crank angle output signal $S_6$ from a crank angle sensor 44 for sensing the rotation of an engine crankshaft 46.

A vacuum regulator 48 for controlling the opening and closing of the EGR control valve 16 comprises a constant-vacuum valve 50 and a pulse-operated electromagnetic valve 52 associated with the valve 50. The constant-vacuum valve 50 functions to obtain a constant vacuum by modifying intake vacuum introduced into the constant-vacuum valve 50 from the intake air passageway 12. The electro- magnetic valve 52 is constructed and arranged to receive square wave signals from the control unit 32. The opening and closing time periods of the electro-magnetic valve 52 are controlled in accordance with the variations of duty ratio of the square wave signals, i.e., the instantaneous rate of ON and OFF times of the square signals within a certain time period, by which the vacuum developed in the constant-vacuum valve 48 is suitably diluted with air from the intake air passageway 12 so as to supply a desired vacuum to a vacuum operating chamber (no numeral) of the EGR control valve 16. The vacuum supplied to the vacuum operating chamber decides the opening degree of the EGR control valve 16 so as to control the exhaust gas recirculation from the exhaust gas passageway 14 to the intake air passageway 12.

Figure 2:
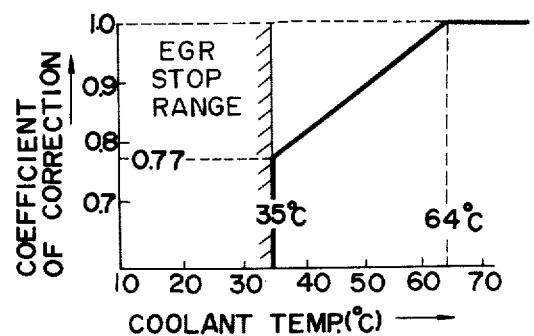
FIG. 2. is a graph showing the variation of coefficient of correction of a required exhaust gas recirculation value on varying engine coolant temperature.

Now, a method for controlling the exhaust gas recirculation in accordance with the present invention will be explained hereinafter with reference to FIG. 2 and in connection with FIG. 1. As described above, the temperature of the engine coolant is sensed by the temperature sensor 36 and the signal of the temperature is supplied to the control unit 32. The control unit 32 previously memorizes a required value of exhaust gas recirculation, at 80° C. of the coolant temperature, corresponding to the pulse width by which a fuel injection amount from the fuel injector 24 is controlled, which pulse width is decided, for example, in connection with engine speed and intake air amount. It is to be noted that a conventional EGR control system similar to that shown in FIG. 1 is arranged such that the exhaust gas recirculation in an amount of 100% of the required value at 80° C. is performed when a coolant temperature reaches a predetermined level such as 35° C. As a result, an excess amount of exhaust gas is recirculated back to the engine, thereby causing degradation in engine running and accordingly in driveability of a motor vehicle on which the conventional EGR control system is mounted.

In order to prevent that an excess amount of exhaust gas recirculation is carried out when the engine coolant temperature is relatively low, according to the present invention, command signals from the control unit 32 to the electromagnetic valve 52 is are corrected as a function of the coolant temperature so that the exhaust gas recirculation amount at a relatively low temperature is decreased as compared with that at 80° C. of the engine coolant temperature. An example of such a method is shown in FIG. 2 in which coefficient of correction for exhaust gas recirculation is indicated. As appreciated from FIG. 2, the duty ratio of the electromagnetic valve 52 is decided so that the exhaust gas recirculation amount at 35° C. in the engine coolant temperature is 77% of the required value or exhaust gas recirculation amount at 80° C. in the engine coolant temperature. When the coolant temperature is below 35° C., exhaust gas recirculation is not carried out as in a conventional technique. In case of FIG. 2, the control unit 32 generates command signals causing that the duty ratio of the electromagnetic valve 52 is decided so that the coefficient of correction values as an equation of the first degree relative to the coolant temperature, from the coefficient of 0.77 at 35° C. in the coolant temperature to the coefficient of 1.0 at 64° C. in the coolant temperature. Such variation of the coefficient of correction can be processed in the control unit 32. Otherwise, the coefficient of correction may be processed to vary as a curved line by means of ROM in the control unit 32. It will be understood that it is advantageous from a stand point of simplification of construction of the control unit 32 to vary the duty ratio of the electromagnetic valve 52 relative to the variation of the engine coolant temperature.

As appreciated from the above, in accordance with the present invention, when the engine coolant temperature is relatively low, leaking of the vacuum applied to the EGR control valve 16 decreases. Accordingly, the opening degree of the EGR control valve 16 decreases to reduce the amount of exhaust gas recirculation. This prevents degradation in driveability of the motor vehicle caused by an excess amount of recirculated exhaust gas.

While the exhaust gas recirculation is has been shown and described as arranged to start regardless of engine coolant temperatures at engine starting when the engine coolant temperature reaches 35° C. in the case of FIG. 2, another exhaust gas recirculation starting manner will be explained with reference to FIG. 3 in which a setting temperature at which exhaust gas recirculation starts is raised when the engine coolant temperature at engine starting is low, in other words, the starting of the exhaust gas recirculation is delayed when ambient air temperature is low.

Figure 3:
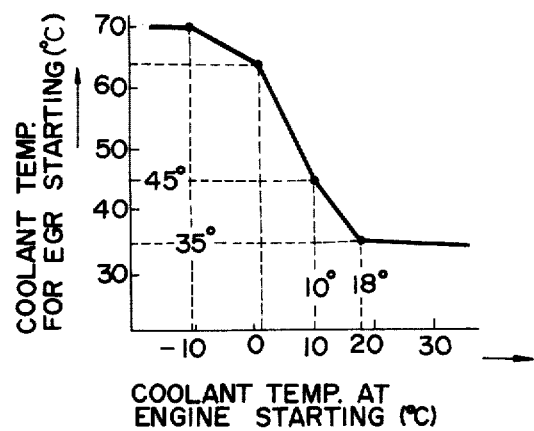
FIG. 3 is a graph showing the variation of engine coolant temperature at which exhaust gas recirculation starts on engine coolant temperatures at engine starting.

In case of an example of FIG. 3, the engine coolant temperature at engine starting is sensed and memorized previously in the control unit 32. Additionally, a required exhaust gas recirculation value at a high engine coolant temperature such as 80° C. is previously memorized in the control unit 32 as a function of the pulse width corresponding to engine speed and intake air amount. Now, engine coolant temperatures at which the exhaust gas recirculation start are, for example, decided as shown in FIG. 3 with respect to engine coolant temperatures at engine starting, in which exhaust gas recirculation starts at 45° C. in the engine coolant temperature when the engine coolant temperature at engine starting is 10° C. The exhaust gas recirculation always starts at 35° C in the engine coolant temperature when the engine coolant temperature at engine starting is 18° C. or higher. It is possible to vary as an equation of the first degree the engine coolant temperatures for starting exhaust gas recirculation within a range between two predetermined engine coolant temperatures at which engine start. It will be understood that after the engine coolant temperature reaches a level at which exhaust gas recirculation starts, the amount of exhaust gas recirculation may be, for example, controlled in a value which is obtained by multiplying a required value of exhaust gas recirculation at 80° C. by the coefficient of correction as illustrated in connection with FIG. 1. As appreciated from the above, the temperature at which exhaust gas recirculation starts is considerably raised when the engine coolant temperature at which engine starts is low. In other words, starting of exhaust gas recirculation can be delayed when ambient temperature is low.

While the engine coolant temperature at which exhaust gas recirculation starts has been described as set at 35° C. in the above-mentioned examples, it will be understood that the same temperature may be higher or lower than 35° C., for example, 40° C. or 50° C., depending upon kinds of engines.

What is claimed is:

1. A system for controlling exhaust gas recirculation in an internal combustion engine, comprising:
   means for performing exhaust gas recirculation in a first required value when an engine temperature is at a first predetermined level or higher;
   means for stopping exhaust gas recirculation when said engine temperature reaches a second predetermined level or lower, said second predetermined level being lower than said first predetermined level;
   means for performing exhaust gas recirculation in a second required value which is lower than said first required value, within a temperature range between said first and second predetermined levels, said second required value increasing as a function of said engine temperature in response to increase in said engine temperature.

2. A system as claimed in claim 1, further comprising means for performing exhaust gas recirculation in said first required value when said engine temperature reaches a third level which is higher than said second predetermined level and lower than said first predetermind level.

3. A system as claimed in claim 2, further comprising mens for increasing a setting temperature for starting exhaust gas recirculation in accordance with lowering in said engine temperature at engine starting when said second predetermined level is at a fourth predetermined level or lower, said fourth predetermined level being lower than said second predetermined level.

4. A system as claimed in claim 1, further comprising a control unit for memorizing said first required value of exhaust gas recirculation as a function of engine speed and engine load.

5. A method for controlling exhaust gas recirculation in an internal combustion engine, comprising:
   performing exhaust gas recirculation in a first required value when an engine temperature is at a first predetermined level or higher;
   stopping exhaust gas recirculation when said engine temperature reaches a second predetermined level or lower, said second predetermined level being lower than said first predetermined level;
   performing exhaust gas recirculation in a second required value which is lower than said first required value, within a temperature range between said first and second predetermined levels, said second required value increasing as a function of said engine temperature in response to increase in said engine temperature.

6. A method as claimed in claim 5, further comprising the step of performing exhuast gas recirculation in said first required value when said engine temperature reaches a third level which is higher than said second predetermined level and lower than said first predetermined level.

7. A method as claimed in claim 6, further comprising the step of increasing a setting temperature for starting exhaust gas recirculation in accordance with lowering in said engine temperature at engine starting when said engine temperature is lower than a fourth predetermined level which is lower than said second predetermined level.

8. A method as claimed in claim 5, further comprising the step of memorizing in a control unit said first required value of exhaust gas recirculation as a function of engine speed and engine load.

* * * * *